United States Patent [19]

Caimi

[11] Patent Number: 4,948,258
[45] Date of Patent: Aug. 14, 1990

[54] STRUCTURED ILLUMINATION SURFACE PROFILING AND RANGING SYSTEMS AND METHODS

[75] Inventor: Frank M. Caimi, Vero Beach, Fla.

[73] Assignee: Harbor Branch Oceanographic Institute, Inc., Ft. Pierce, Fla.

[21] Appl. No.: 211,586

[22] Filed: Jun. 27, 1988

[51] Int. Cl.$^5$ ............................................. G01B 11/24
[52] U.S. Cl. ........................................ 356/376; 336/1; 336/4
[58] Field of Search ....................... 356/1, 4, 375, 376, 356/354, 356

[56] References Cited

U.S. PATENT DOCUMENTS 4,294,544  10/1981  Altschuler et al. ................. 356/376
4,330,212   5/1982  Miller ................................. 356/375

Primary Examiner—Richard A. Rosenberger
Attorney, Agent, or Firm—Carroll F. Palmer

[57] ABSTRACT

Range and/or profile of a test surface, particularly a submarine surface, are determined by passing a laser beam through a holographic grating structured to emit a divergent light beam defining a two dimensional array of dots in a predetermined pattern and projecting such beam on the test surface. A receiving device, e.g., video camera, ascertains the positions of the dots in the pattern reflected from the test surface and comparison is made of such positions relative to the positions of the respective dots previously reflected in like manner from a datum surface. The values of the displacements of test surface dots from datum surface dots are used to determine the range or orientation of the test surface relative to the grating or the profile of the test surface.

8 Claims, 2 Drawing Sheets

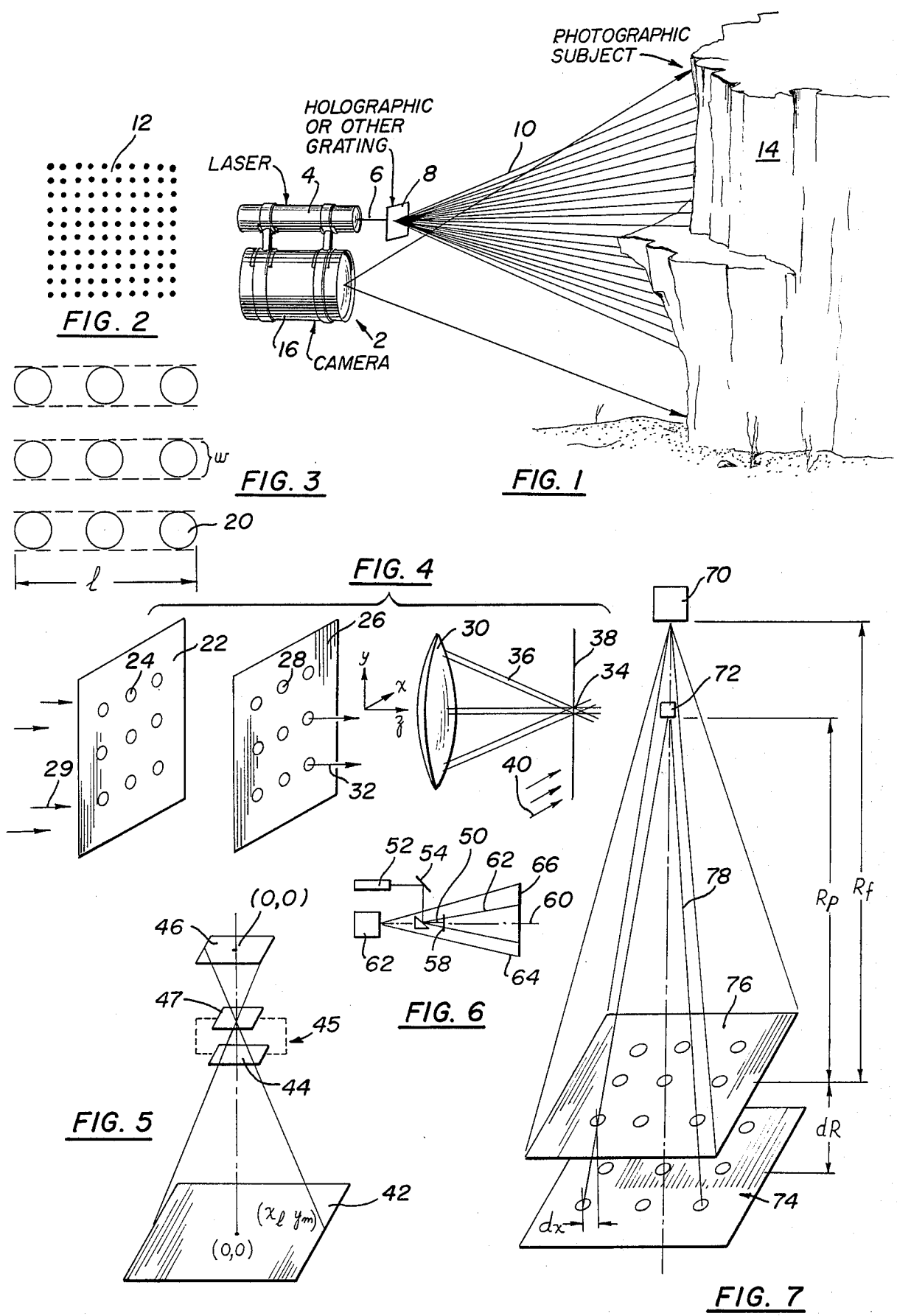

STRUCTURED ILLUMINATION SURFACE PROFILING AND RANGING SYSTEMS AND METHODS

BACKGROUND OF THE INVENTION

1. Field of the Invention

This invention relates to new methods and means for remotely determining the range from a datum location to a surface and/or the profile of the surface. More particularly, it concerns methods and devices that enable the position, i.e., range and orientation, of submarine surfaces relative to a moveable object, e.g., a camera, to be determined and/or to remotely ascertain the apparent profile of such surface from the moveable object.

2. Description of the Prior Art

There are many situations in which the location of an object relative to (a) its distance to a surface and/or (b) its orientation to such surface must be determined in order to (1) accurately position the object relative to the surface, (2) to project something from the object to the surface and (3) for many other reasons (see U.S. Pat. No. 4,707,094). This invention is specifically directed to methods and devices useful in those particular situations in which an object, e.g., a camera, a recording system, an imaging device, analysis instrument, etc., must be accurately positioned relative to a surface under conditions that present acute problems in determining the distance and orientation of the object relative to the surface and/or the profile of the surface, particularly in submarine locations. However, it is contemplated that these methods and devices will be put to other uses than in submarine environments.

By way of example of problems associated with submarine operations, as contrasted to terrestrial operations, are those encountered with underwater visual recordings made with photographic or video cameras which typically have limited remote controls. This is particularly true of deep-sea camera systems where camera lens opening and focus are preset and the photographer must somehow arrange for the subject to be at the correct distance, within the field of view and properly oriented with respect to the viewing system at the time of exposure.

Another example occurs in taking an accurate census of living benthonic objects per unit area of a contoured benthonic surface, e.g., in trying to determine what environmental impact a foreign structure, such as a drilling rig, has on the area's living object population over a period of time. Thus, while it is possible to count or record the number of objects within a prescribed submarine field of view, an accurate count per unit benthonic area thereof is not possible unless the profile of the surface is known so the area of surface encompassed by such field can be determined.

Devices and techniques for terrestrial operation of cameras, measurement instruments, etc. are not directly transferable to submarine systems. Differences between the physical properties of air and water result in major differences in the propagation of light and sound in the two media. Additionally, spurious material and signals can cause many "false" exposures or measurements to occur with submarine operations while this is not a serious consideration in use of surface devices. Hence, a system which depends on the propagation of energy waves for operation must be designed for the medium in which it is to be used.

In the case of terrestrial operations, many vision techniques for use with robots, etc. that have been described in the literature are intended to provide or enhance visual capabilities to determine object range, orientation and surface characteristics, e.g., shape, color, texture, etc., see. U.S. Pat. No. 4,459,027; J. Jalkio etal., "Optical Engineering" 24(6), 966–974 (Nov./Dec. 1985) and Livnat etal.—"Optical Engineering" 24(1), 150–152 (Jan./Feb. 1985). Such techniques are usually categorized according to whether triangulation or non-triangulation concepts are employed and whether the system is active or passive. The methods and systems of this invention can be considered to be a passive triangulation type, but are distinguished from schemes found in the prior art which primarily utilize projections of one-dimensional lines, because the systems of this invention involve projections of two-dimensional arrays of spaced dots.

One deficiency of line projection methods results from the distribution of optical flux over the area occupied by the line image(s). In relatively compact systems where the illumination volume is small (laboratory or certain industrial applications), the luminous flux required to illuminate the object area is usually much less compared to submarine applications where the surveyed area is large. Because detection is reliant upon a minimum level of object illumination, i.e., flux per unit area, and because of optical absorption or scattering loss in the aqueous medium, submarine applications usually require a larger radiant flux from the source. In addition, remotely piloted or autonomous vehicles used in undersea operation prefer the use of highly efficient systems due to energy limitation inherent in their design. By reducing the area of the projected light patterns in accordance with this invention, it is possible to reduce the optical flux requirement from the source. Hence, the size and power consumption of the source is correspondingly reduced.

Additional concern stems from the need of submarine illumination systems to operate in an environment having uncontrolled lighting. For example, shallow-water submarine systems are subject to receiving background illumination from the sun. In such case, suppose that ambient lighting from the sun is present over a section of the benthonic surface yielding an illumination of $R_o$ watts over the image area and that this optical flux is distributed over the spectral region where the image detector is sensitive. In order to achieve detection of the projected pattern from the vision system, it is necessary that the projected radiance in each element of the pattern exceed that of the background by some factor, preferably greater than one. Thus, a projector uniformly distributing flux over the image area would require an output greater than $R_o$ assuming a lossless medium. Alternately, a projection of lines having equal light and dark width would require a flux greater than $R_o/2$ since only half of the image area would be illuminated. The required source flux $R_s$ for arbitrarily shaped illumination will be $R_s = R_o \times$ (area of projection)/(image area), and if this shaped illumination is an array of small, spaced dots, much less light, e.g., 60% less, is required to provide acceptable determinations to be made.

Notwithstanding the extensive prior work and developments with structured illumination systems for ranging and remote profiling of objects, substantial improvements are still needed in such art, particularly for the submarine systems.

OBJECTS

A principal object of the invention is to determine characteristics of a surface from a position remote from such surface using structured illumination.

Further objects include the provision of:

1. New illumination methods and means for determining the range from a datum location to a surface and/or the orientation of an object at the datum location relative to such surface.

2. New illumination methods and means for remotely ascertaining the profile of a surface.

3. Such methods and means that require minimal optical flux to make the characteristics determination and thereby rendering same applicable to sensing large areas as required for underwater exploration tasks.

4. Such methods and means that are amenable to reduction of ambiguity errors.

5. Methods and devices that enable the position, i.e., range and orientation, of submarine surfaces relative to a moveable object, e.g., a camera, to be determined and/or to ascertain the apparent profile of such surface remotely from the moveable object.

6. New improvements in structured illumination techniques for the remote ranging and profiling of surfaces, particularly for use in submarine locations.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the provision of new methods for determining characteristics of a test surface which basically comprise the steps of (a) projecting a beam of collimated rays from a ray source along a longitudinal axis, (b) converting the beam into a divergent array of spaced dots of the rays in a predetermined pattern by passage of the beam through a holographic grating that intersects the longitudinal axis, (c) projecting at least a portion of the divergent array of spaced dots onto a test surface remote from the grating, (d) forming a image of the pattern of dots reflected from the test surface at a datum plane that intersects the longitudinal axis, (e) comparing the positions of the dots in the image to the positions of the respective dots in a datum image previously reflected in like manner from a datum surface to obtain values of displacements of the test image dots from the respective datum image dots, and (f) using such displacement values to determine one or more characteristics of the surface.

In preferred methods of the invention, the characteristics to be determined are the distance of an object to the surface, the orientation of the longitudinal axis of the object relative to the surface and the profile of the surface.

The objects of the invention are further accomplished by the provision of new devices for determining characteristics of a surface using structured illumination that essentially comprise in combination (1) a ray source for projecting a beam of collimated rays along a longitudinal axis, (2) a holographic grating, that intersects such longitudinal axis, capable of converting the beam into a divergent array of spaced dots of the rays in a predetermined pattern and projecting at least a portion of the divergent array of spaced dots onto a surface remote from the grating, (3) means for forming a image of the pattern of dots reflected from the surface at a datum plane that intersects the longitudinal axis, (4) means for comparing the positions of the dots in the image to the positions of the respective dots in a datum image previously reflected in like manner from a datum surface to obtain values of displacements of the image dots from the respective datum image dots, and (5) means using the displacement values to determine one or more characteristics of the surface.

BRIEF DESCRIPTION OF THE DRAWINGS

A more complete understanding of the invention may be had by reference to the accompanying drawings in which:

FIG. 1 is a schematic isometric view of structured illumination device in operation in accordance with the invention.

FIG. 2 is a schematic representation of a dot illumination pattern of the invention superimposed on an plane image surface.

FIG. 3 is an enlargement of a small portion of the pattern of FIG. 2.

FIG. 4 is a diagramatic illustration of recording geometry for use in producing desired illumination patterns in accordance with the invention.

FIG. 5 is a schematic representation of various elements of a structured illumination device in accordance with the invention.

FIG. 6 is a schematic view of an illumination device of the invention.

FIG. 7 is a diagramatic illustration for use in explaining the principle of operation of the invention.

DESCRIPTION OF THE PREFERRED EMBODIMENTS

Figure 8:
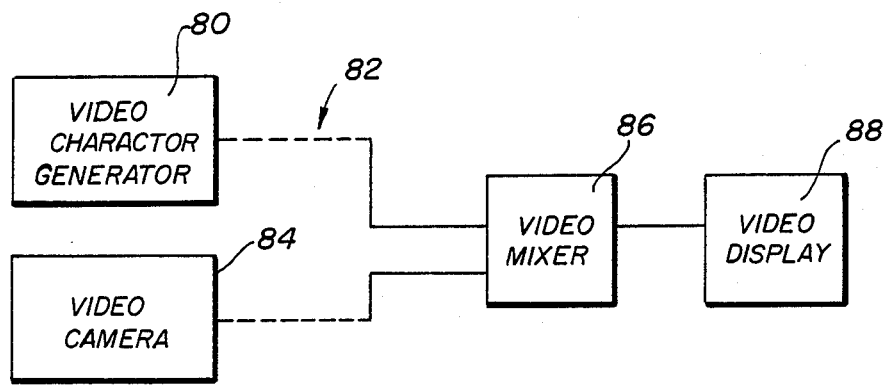
FIG. 8 is a schematic representation of visual means for making a comparsion between a reflected dot array and the data image in accordance with the invention.

Referring in detail to the drawings, in which identical parts are identically marked, a structured illumination device 2 of invention comprises a ray source (laser) 4 for projecting a beam 6 of collimated rays along a longitudinal axis and a grating 8 that intersects such axis to convert the beam 6 into a divergent array 10 of spaced rays in a predetermined pattern 12. In the embodiment of FIG. 1, the divergent ray pattern 12 is projected onto the image surface 14.

The device 2 also includes a video camera 16 for forming a image of the pattern of dots (not shown) reflected from the surface 14. In FIG. 1, the camera is slightly offset laterally from the ray source 4, but the reference plane (video receptor) essentially intersects the longitudinal axis of the beam 6.

The method of the invention for determining characteristics of the surface 14 comprises projecting the beam 6 of collimated rays from laser ray source 4, converting the beam 6 into the divergent array 10 of spaced rays in a predetermined dot pattern 12 by passage of the beam through the holographic grating 8 that intersects the longitudinal axis of the beam 6 and projecting the divergent array 10 onto the surface 14. The pattern of dots 12 reflected from the surface 14 forms a image on the reference plane. The positions of the dots in the recorded image of dots reflected from the surface 14 are compared with the positions of the respective dots in a predetermined reference image previously reflected in like manner from a datum plane surface to obtain values of displacements of the virtual image dots from the respective reference image dots. Using the displacement values, one then determines various characteristics of the surface 14, e.g., its distance to a surface.

A further understanding of the invention can be obtained by reference to FIGS. 3-6.

Devices and methods of this invention are capable of operating in environment having uncontrolled ambient lighting, e.g., shallow ocean water subject to background illumination from the sun. Assume that such ambient lighting yields an illumination of $R_o$ watts over the image area and that this optical flux is distributed over the spectral region where the image detector, e.g., camera 16, is operative. In order to achieve detection of the projected pattern from an image surface, e.g., submarine surface 14, it is necessary that the projected radiance in each dot of the pattern 12 exceed that of the background by some factor, preferably a factor greater than one. Thus, in the case shown in FIG. 1, this would require a flux in the projection array 10 greater than $R_o$ assuming a lossless medium. The required source flux $R_s$ for arbitrarily shaped illumination 10 is given by the formula:

$$R_s = R_o \times (\text{area of projection}) \times (\text{image area})^{-1}.$$

A structured illumination projection of the invention is illustrated by FIG. 3 consisting of an array of circular dots 20 of diameter d=w, which have a periodicity of 2w in both the vertical and horizontal directions. The number of dots projected is N producing a total projection area A equal to Npw/4 (where p=π=3.1416+). By comparison, a projection array in the form of lines would produce a projection area A' equal to N'1w', where the lines are of length 1, width w' and number N'. Accordingly, the ratio of A/A' NpW(¼)/N'1w' p/8 0.39 (where 1=2N'w' for a square pattern), so much less flux is required, i.e., about 40% in this case, using a dot array rather than a line array.

In accordance with the invention, either reflective or transmission phase-grating type holograms are used for the generation of the structured illumination patterns, e.g., pattern 10 of FIG. 1. The technical recording of holograms is well known to those in the art, but a novel method has been discovered for doing this in accordance with the invention as shown in FIG. 4.

A mask 22 is prepared with a series of apertures 24 located in predetermined position along an (x, y) Cartesian coordinate system centered upon a longitudinal axis z. The mask 22 is followed by a lens array 26 composed of negative lenslets 28 with focal length $-f_o$. The lenslets 28 are centered on identical x,y coordinates to the apertures 24. Immediately following array 26 is a lens 20 with positive focal length $f_o$ identical to the negative focal length $-f_o$ of lenslets 28. The mask 22, array 26 and lens 30 are required to be in close proximity compared to the focal length $f_o$, i.e., they should be located with the minimum possible separation along the z axis. Plane wave illumination 29 passes the apertures 24 and passes lenslets 28 generating separate beam rays. 32.

Lens 30 acts to cancel the divergence (wavefront curvature) of each ray 32 as it exits the array 26, thus restoring their collimation. Each ray 32 is also deflected by lens 30 toward the lens focal point 34 conveying a bundle of collimated beams 36 which overlap as they impinge upon the holographic recording media 38. The rays 32 propagate at an angle O' with respect to the z axis determined by the formula $\tan^{-1}[(x^2+y^2)^{\frac{1}{2}}/f_o]$. Thus, the location of each aperture at spatial coordinates (x, y) produces a ray propagating at a specific angle O'.

In order to record a hologram, the planewave reference beam (laser beam) 40 is incident on the recording media 38 at an angle with respect to the y axis substantially greater than the angle O' corresponding to the ray bundle 23 emanating from the furthest aperture from the coordinates (x=0, y=0). The reference beam 40 is also of sufficient size that it overlaps the converging rays 23. The hologram is recorded by methods known to the art and is preferably a phase type optimized for highest diffraction efficiency.

The recorded hologram contains information regarding wavefronts used in recording as is well known, e.g., by illumination with a collimated or plane-wave from a laser of the same wavelength used in construction, the beams used in recording may be identically reconstructed. Thus, a diverging array of collimated projections will be produced when laser illumination as shown is allowed to strike the holographic recording.

A schematic representation of operation of the new devices of the invention is given in FIG. 5.

The planar reference surface 42 which is located parallel to and at a distance $R_F$ forward of the front principal plane 44 of an imaging system 45 has multiple light spots projected thereon from a holographic grating at coordinates $(x_l, y_m)$ for l,m=0, ±1, ±2, etc.

A virtual image of the surface 42 is formed at the image plane 46 of the video camera or other detector unit. The position of each of the reflected spots $(x_l, y_m)$ as viewed in plane 46 is subsequently compared to corresponding position spots reflected from a datum surface (not shown) that is illuminated by the same projection system.

Plane 47 is the rear principal plane of the imaging system 45.

The differences in positions of each pair of reflections, i.e., spots reflected from the surface under evaluation (test surface or test plane) and corresponding spots reflected from the datum surface (datum plane), are related to and used to determine the range variation of surface 42 within rectangular format reference cell on image plane 46 coordinates $(x_l, y_m)$, which correspond to the location of each spot reflection from the surface 42. In order to avoid ambiguity between adjacent pairs of spot reflections, the system must be designed so that the reflections from SE 42 remain within the reference cell boundaries of dimensions $[(x_{l+1}-x_{l-1})/2, (y_{m+1}-y_{m-1})/2]$.

The position of the light projector 4 to the recorder (camera) 16 is critical to the methods and devices of the invention. Thus, ideally the longitudinal axis of the projector and recorder should coincide. An arrangement to do this is shown in FIG. 6 where the effective longitudinal axis 50 of radiation from the laser 52 via mirror 54 and prism 56 passes through the holographic grating 58 and coincides with the longitudinal axis 60 of the camera 62. Hence, projected beams 62 and beams 64 reflected from the image surface 66 are centered on the same longitudinal axes 50, 60.

Another arrangement for providing the desired projection/recordation beam coincidence is shown in FIG. 7 which shows recorder device 70, a compact projector device 72 and an image surface 74. Also shown, for the purpose of a mathematical analysis of the new methods, is a datum plane surface 76.

For an analysis of a one-dimensional array of projected rays, the analytical expressions depend on the spatial coordinates of the image (x, y) to produce a range estimate (z) over the image area. Spatial variance is made symmetric with respect to the image centroid (X, Y), namely x=0, y=0, by having the longitudinal axis of the device 72 and of the device 70 coincide as in FIG. 7. With such set-up, range deviation across the image surface 74 from the plane 76 located at a distance $R_f$ from device 70 may be estimated using the following formula wherein x, y specify the projection location of a ray at the plane 76 along the coordinates x and y, while x' and y' (X' and Y') specify the coordinates at the image plane 74 observed at the camera and $R_f$, $R_p$, dx' and dR, represent the distances shown in FIG. 7:

$$\frac{dx'}{x'} = \left[\frac{R_f}{R_p} - 1\right]\frac{dR}{R_f + dR} =$$

$$\left[\frac{R_f}{R_p} - 1\right]\frac{dR}{R_f} \quad (dR << R_f)$$

When $R_f = R_p$ (the case when the center of projector 72 and the point from which the the detectors field-of-view is derived coincide), no range information is derived, i.e., dx'/x' 0. Suppose, however, that $R_p = 0.9 R_f$, a practical situation when $R_f = 10$ ft. The variation observed in location of each X projection along the x-axis is approximately 11% of the variation in range dR along the z-axis when compared to $R_f$ as computed above. Because an x dependence is not observed in the equation, the fractional variation of each projection observed position in comparison to the distance of projection in the plane 76 from the origin is independent of the x, y coordinates, confirming a degree of spatial invariance not achieved with off-axis systems. If ten projections are used on each side of the center, e. g., ±10, the range deviation dR may be sensed over about 4.5 ft. without ambiguity when $R_f = 10$ ft. Thus, the projected image locations on the plane 74 viewed by the detector 70 are approximately separated by a distance D=x'max./n, where n is the maximum number of projections along the x axis from X'. Should dx' exceed ½ D, it might be possible to mistake the observed position of one projection for that of another, thereby resulting in range ambiguity.

Greater sampling of the image area, i.e., a larger number of projections "n", results in a demonstrable increase in the range ambiguity. A reduction in this can be made by enlarging the fraction $R_p/R_f$, which correspondingly reduces the range sensitivity. Encoding, e.g., by color, the projections so that they may be identified more easily over a larger distance can be used to reduce ambiguity. In a color encoding scheme, a color sequence can be repeated periodically as a function of "n", e.g., the pattern orange, yellow, green, blue can be repeated multiple times to allow greater sampling frequency along both x and y dimensions.

In preferred embodiments, the location of the hologram grating 72 is within the field-of-view of the detector 72 and positioned normal to the z axis. However, FIG. 1 illustrates a more easily implemented scheme that can be tolerated where the hologram 8 is located in close proximity to the field-of-view of the detector 16. Because the hologram in principle may be as small as the projected area of a single dot of the array 10, close proximity may be obtained, e.g., it is possible to locate the laser 4 and hologram 8 in the housing of the camera 16.

Spatial filtering of the reflected image can be used to extract the location of laser projections. The optimal filtering is achieved by allowing a spectral bandpass about the spatial frequency characteristic of the projection spacing, e.g., 2w in FIG. 3, in the reference plane. It can also be advantageous to utilize color information in the image analysis to delete portions of the image, e.g., everything but the brightly illuminated areas corresponding to the projected dots. Narrow and optical filters can be used to limit the spectral response of the image detector when only the projection image is desired.

Once the reflected image is obtained on photographic film, video tape, electronic chip, etc., it may be compared to the predetermined reference image to determine range, orientation and/or contour of the image surface within the image boundary. In a specific application of the invention, the reflected, detected image can provide a means to position a submarine vehicle or camera platform with respect to both range and attitude relative to a smooth or rough surface. The location of the dots of the projected dot array in the test image ($\bar{x}', \bar{y}'$) in comparison to the locations in the datum image (x',y') contains information regarding deviation of each dot location from the reference plane.

For smooth (planar) topography, it is only necessary to ensure that the functions of $\bar{x}' - x'$ and $\bar{y}' - y'$ are zero to optimally align the image surface to the location and orientation of the reference plane. Since attitude and range controls in a submarine vehicle are conventionally independent functions, the vehicle can first be maneuvered to obtain the same absolute value for both $\bar{x}' - x'$ and $\bar{y}' - y'$ to achieve proper attitude. Conversely, the vehicle may be adjusted for zero value of $\bar{X}' - X' = \bar{Y}' - Y'$ to obtain proper range at the image centroid. Maneuvering the vehicle attitude to reduce these values for all the dots will follow.

Vehicle positioning over rough terrain is substantially more difficult, but can be attained statistically. In this case, it is advantageous to minimize a variance function q (commonly called the second central moment of a random u), i.e., $$q = \int_{-\infty}^{\infty} (u - u')^2 p_u(u) du,$$

where $p_u(u)$ is a probability density function.

Since the probability that u will be observed is equal for all values of u, i.e., a uniform distribution, the density function is constant. It can be shown that the variance is minimized by minimizing the function $(u-u')^2$ for all values of u and that the stated integral can be approximated as a discrete summation. Computation of the sum can be made by digital computer in real-time thereby providing a single parameter which can be minimized by positioning of the vehicle. It is necessary, however, to position the vehicle with respect to range and then with respect to attitude over multiple tries to achieve best conformance.

An alternate, effective method for producing a conformance measure using this scheme is based upon constructing a correlation function. The datum image, r, consists of a series of dot patterns which if construed as being infinitessimal in cross-section may be assumed to be a series of delta functions, i.e., $$r = \sum_{l=1}^{N} \sum_{m=1}^{M} \delta(x' - x'_l, y' - y'_m)$$

where spacing over regular intervals and a rectangular format is assumed in this definition. Primes indicate that the coordinate system is within the image plane of the recorder (camera).

The test image, h, may also be expressed as a series of delta functions, but with arguments which differ according to the range elevation of the terrain from the reference plane location near the coordinates (l, m). In general, h may be represented as:

$$h = \sum_{l=1}^{N} \sum_{m=1}^{M} \delta(x' - \bar{x}'_l, y' - \bar{y}'_m)$$

Correlating r with h by either optical or electronic means will produce a measure whereby a corrugated or rough image surface can be made to conform to the reference plane orientation in the best possible way, i.e., conformance can be achieved over the greatest number of sampled points.

The correlation measure can be described in terms of Fourier tranforms of both functions. In this case, the correlation function is given by the inverse Fourier Transform of the product of F(r) and F(h)*, where the correlation of the two functions is indicated by the symbol $\odot$. Thus:

$$r \odot h = F^{-1}[HR^*]$$

where R is the Fourier transform of h and R* is the complex conjugate of the Fourier Transform of r and the symbol $F^{-1}$ indicates an inverse Fourier Transform operation.

The Fourier Transform of the r and h equations above may be taken as yielding:

$$R^* = \sum_{l=1}^{N} \sum_{m=1}^{M} \exp[+j\, 2\pi(f_x x'_l + f_y y'_k)]$$

$$H = \sum_{l=1}^{N} \sum_{m=1}^{M} \exp[-j\, 2\pi(f_x x'_l + f_y y'_k)]$$

where $f_x$ and $f_y$ represent frequency in the x and y directions respectively.

Physically, the last two equations represent linear phase factors on a propagating wave and therefore indicate a deviation or tilt in the wave direction of arrival at the Fourier plane. The product of HR* will produce a constant plus a series of exponential factors which depend upon the difference of $x'_l - \bar{x}'_l$ and $y'_m - \bar{y}'_m$ for different values of l and m. The constant term is of most interest in this vehicle application since it represents the sum of all exponential factors having $x'_l = \bar{x}'_l$ and $y'_m = \bar{y}'_m$, i.e., matching locations of the projected images in the datum plane and the actual image. The inverse transform of HR* therefore consists of a series of delta functions appearing at coordinates corresponding to the differences given above plus a delta function at the origin proportional to the constant of sum term mentioned above. Hence, by observing the correlation function height at the origin, the degree of matching between projection points in the test image to those in the datum image (represented by the sum) can be obtained directly.

Properties of the delta function useful in the previous discussion are the following:

$$F\{\delta(X, Y)\} = 1$$

$$F\{\delta(X - X_o, Y - Y_o)\} = \exp\{-j2\pi(f_x X_o + f_y Y_o)\}$$

$$F^{-1}\{\exp[-j2\pi(f_x X_o + f_y Y_o)]\} = \delta(X - X_o, Y - Y_o)$$

$$F^{-1}\{\text{constant}\} = \text{constant} \times \delta(X, Y)$$

Since the projections used are of finite spatial dimension, they are only approximated by the delta function analysis as given. In actuality, contributions to the correlation function evaluated at the origin are also made by projections not exactly aligned with the datum image locations due to the finite area of the projection. This method therefore takes into account all projection locations if the size of the projected dots in the array is properly chosen.

The advantage gained by this technique for comparing positions of the dots in the test image recorded in the recording device with the positions of the respective dots in the predetermined datum image is that it is based upon image correlation, a standard mathematical method.

Such image correlation operations may be performed in real-time by readily available digital processors or by techniques developed for optical computing, e.g., see Caimi, Casasent, et al, "Optical Engineering" 19: 716-721 (1980).

With reference to FIG. 8, image correlation may also be done by visual comparsion between the test image dot array and the datum image. Thus, one may observe visually the project locations in comparison to a set of datum locations. Such datum locations correspond to the laser image locations which would result from an idealized surface located at a distance $R_f$ from the detector (camera) and at a preferred orientation.

Assuming a video camera is used for observation of the test image, the datum image may be produced by a video generator circuit 80. Such generators are known to those skilled in the art and can produce colored, bright or dark markers at programmable locations with the test image. The markers are chosen to be as small as possible within the resolution and display capabilities of the entire video system 82 which includes the video camera 84, video mixer 86 and the video display (CRT) 88.

The brightness of each of the projections must exceed the brightness of any resolvable image point (pixel) of the display 88 in order to be visually detectable. Thus, the optical flux must be efficiently distributed by the projection system and must exceed some minimum value over the area of each projection at the scene. The relative position of each projection may then be visually compared ot the position of each marker. The position of the submarine vehicle is subsequently adjusted to minimize the relative postition between each datum/test pair. Over a rough surface, it will generally be impossible to minimize the distance between every pair.

However, it can be shown that the minimum error in estimation of the average range and orientation is obtained by minimizing the sum of the distance between each pair as previously noted. Thus, over relatively smooth surfaces, a visual method may be used; over rough surfaces it may be necessary to resort to non-visual methods.

Non-visual or automated comparsion methods are based on assuming each illumination point is a delta function as previously discussed. Video-rate digital image correlators are available commercially. Manufacturers of such devices include Texas Instruments and Visual Understanding Systems of Pittsburgh, PA. In operation, two images are supplied to the correlator, one for datum and one for test of comparsion. For the present invention, the datum image is obtained using only the projected illumination striking a flat surface at the desired range and orientation. Then, the image is stored in video disk, tape or memory. This constitutes "calibration" of the system. The camera or vehicle is then removed from the calibration site and put into service. Video output from the camera is taken continuously as the vehicle moves and is provided as the comparison output. The datum image, stored during calibration, is used continuously for comparsion to the real time video input. Output from the video correlator may be observed graphically at the image center for the largest signal as the vehicle range and attitude are adjusted.

Figure 9:
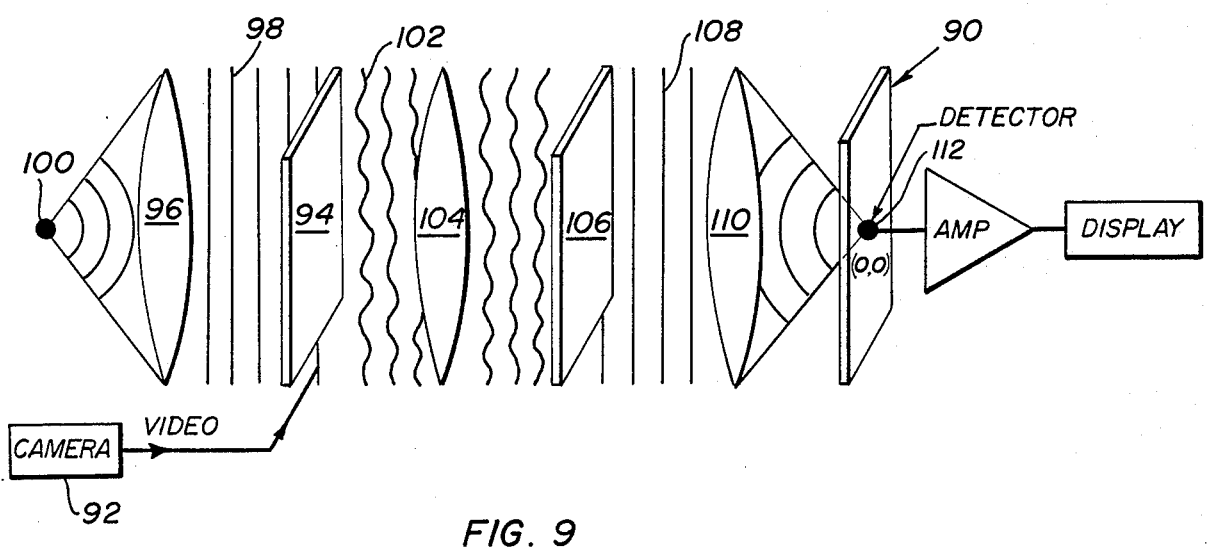
FIG. 9 is a schematic representation of an optical correlator for real-time processing of a submarine vehicle position and attitude relative to a remote surface in accordance with the invention.

An optical correlator may also be used for making the comparsions in accordance with the invention and provides a means for estimating a submarine vehicle's range/attitude over rough surfaces. A typical optical correlator is schematically shown in FIG. 9 (see A. Vander Lugt, IEEE Trans. on Information Theory IT-10, 139–145, 1964 and J. W. Goodman, *Introduction to Fourier Optics*, McGraw Hill, NY, 1968).

As previously disclosed, the test image may be detected by means of photographic film, video tape or electronic chip. To use an optical correlator approach, the preferred means for detection of the test image is a video camera, although other means is possible.

In the optical correlator system 90, the video camera 92 detects a test image in video format $h(x',y')$ and the resulting signal is applied to a spatial light modulator (SLM) 94. The SLM converts the video signal into an amplitude or intensity transparency $h(x',y')$. The lens 96 produces a spatially uniform, planar wavefront 98 from highly monochromatic light source 100, typically a laser.

By way of example, a "Casio" liquid crystal television could be used as a SLM (see Boreman, Proceedings of SPIE Optical Information Processing, Vol. 639, 1986).

In passing through the SLM 94, the wavefront 98 is modulated by the function $h(x',y')$ to wavefront 102. The lens 104 produces a Fourier transform of h (i.e., H) at its right-most focal plane. A holographic mask 106 placed in this plane contains several transmittance functions, one of which is proportional to R* multiplied by an exponential factor which describes the direction the exiting beam 108 will propagate. The hologram of mask 106 is previously recorded by standard methods known in the art and is constructed using a datum image r to create a complex conjugate Fourier transform of r (i.e., R*). Thus, in a given direction, the product HR* will be observed.

Lens 110 foms the inverse Fourier transform in the given direction and produces the correlation of h and r at the output plane where the detector 112 is positioned. The desired result is the correlation at or near the coordinates (x',y') (0,0). The detector 112 responds to the light intensity at any given point and is an estimate of the degree of match between the datum image r and the test image detected by the video camera 92.

In accordance with the invention, profiles of surfaces may be determined using the following formula:

$$\Delta R = \frac{\Delta X'_l}{X'_l} \left[ \frac{R_F \cdot R_P}{R_F - R_P} \right]$$

for projections along the x axis and $R_F \neq R_P$.

It is necessary to measure $x'_l$ at a particular distance from the point of origin to obtain an estimate of the range deviation from the plane. In the general case where projections are located at nearly regular positions in an x-y plane, R may be estimated from:

$$\Delta R_{l,m} = \frac{\Delta v_{l,m}}{|v_{l,m}|} \left[ \frac{R_F \cdot R_P}{R_F - R_P} \right]$$

where $$|v_{l,m}| = \sqrt{x'^2_l + y'^2_m}$$

and $R_F \neq R_P$.

$Y_{l,m}$ is a vector from the origin to the coordinates (l,m) in the datum image. $\Delta Y_{l,m}$ is the deviation from the coordinates (l,m) in the direction of $Y_{l,m}$, to the location of the projection in the nearest vicinity to (l,m) in the test image. In other words, $$|\Delta v_{l,m}| = \sqrt{(x'_l - \overline{x}'_l)^2 + (y'_m + \overline{y}'_m)^2} ,$$

where $(x'_l, y'_m)$ are the coordinates of the projections in the test image. It remains to provide means for processing this image to obtain $\Delta Y_{lm}$ and $Y_{lm}$.

Using a digital image processor (which need not provide a real-time output if the vehicle is moving slowly or is stopped), the datum vectors $Y_{lm}$ known for all (l,m). This data is stored. The location of the highest intensity in the reflected image corresponding to each projection may also be stored as $(\overline{x}'_l, \overline{y}'_m)$. Since $(x'_l, y'_m)$ is known for each (l,m), $|\Delta Y_{lm}|$ may be computed from the stored data as shown above. The sign of R, i.e., where there is a depression in the reflecting surface, is determined from the polarity of $(x'_l - \overline{x}'_l, y'_m - \overline{y}'_m)$.

An alternate procedure comprises forming the correlation between the test pattern or image at coordinates $(\overline{x}'_l, \overline{y}'_m)$ and the datum image at $(x'_l, y'_m)$. This assumes the projection occupies a finite area and the the amount of mismatch in location of the two image areas can be estimated directly from the correlation of the two areas. Therefore, a correlation must be performed at as many points (l,m) as the estimate for $\Delta R$ is desired. Polarity can not be easily determined by this procedure, however.

Other optical template-matching techniques may also be applied to the apparatus and methods of the invention for surface profiling.

The embodiments of the invention in which an exclusive property or privilege is claimed are defined as follows:

1. A structured illumination method for determining characteristics of a surface which comprises:
   projecting a beam of collimated rays from a ray source along a longitudinal axis,
   converting said beam into a divergent array of spaced dots of said rays in a predetermined pattern by passage of said beam through a holographic grating that intersects said longitudinal axis,
   projecting at least a portion of said divergent array of spaced dots onto a test surface remote from said grating a distance of $R_p+dR$,
   forming an image of the pattern of dots reflected from said test surface in recorder means that substantially intersects said longitudinal axis at a distance $R_F+dR$ along said axis from said test surface, with the proviso that $R_p$ shall not equal $R_F$,
   projecting a similar divergent array of spaced dots onto a datum surface remote from said grating a distance of $R_p$,
   forming an datum image of the pattern of dots reflected from said datum surface in recorder means that substantially intersects said longitudinal axis at a distance $R_F$ along said axis from said test surface,
   comparing the positions of said dots in said test image to the positions of the respective dots in said datum image to obtain values of the displacements of individual dots in said test image from the respective individual dots in said datum image, and
   using said individual dot displacement values to determine one or more characteristics of said surface.

2. The method of claim 1 wherein said characteristics are the distance of said recorder means to said test surface and the orientation of said longitudinal axis relative to said test surface.

3. The method of claim 1 wherein said characteristics are the profile of said test surface.

4. The method of claim 1 wherein $R_P=0.9R_F$.

5. A device for determining characteristics of a surface using structured illumination which comprises:
   a ray source for projecting a beam of collimated rays along a longitudinal axis,
   a holographic grating that intersects said longitudinal axis for converting said beam into a divergent array of spaced dots of said rays in a predetermined pattern and project at least a portion of said divergent array of spaced dots onto a surface remote from said grating,
   recorder means positioned substantially on said longitudinal axis a distance $R_F+dR$ from said test surface different from the distance $R_P+dR$ of said grating to said test surface for recording a test image of the pattern of dots reflected from said test surface,
   means for comparing the positions of said dots in said test image to the positions of the respective dots in a preselected datum image previously reflected and recorded in like manner from a datum surface positioned at a distance $R_F$ from said recorder means and a distance $R_P$ from said grating to obtain values of displacements of said test image dots from the respective datum image dots, and
   means using said displacement values to determine one or more characteristics of said surface.

6. The device of claim 5 wherein said characteristics are the distance of said recorder means to said test surface and the orientation of said longitudinal axis relative to said test surface.

7. The device of claim 5 wherein said characteristics are the profile of said test surface.

8. The device of claim 5 wherein $R_P=0.9R_F$.

* * * * *